US007480919B2

(12) United States Patent
Bray et al.

(10) Patent No.: US 7,480,919 B2
(45) Date of Patent: Jan. 20, 2009

(54) SAFE EXCEPTIONS

(75) Inventors: Brandon R. Bray, Redmond, WA (US);
Bryan W. Tuttle, Newcastle, WA (US);
Louis Lafreniere, Seattle, WA (US);
Philip M. Lucido, Redmond, WA (US);
Richard M. Shupak, Bellevue, WA (US); Daniel R. Spalding, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 526 days.

(21) Appl. No.: 10/602,952

(22) Filed: Jun. 24, 2003

(65) Prior Publication Data

US 2004/0268365 A1 Dec. 30, 2004

(51) Int. Cl.
*G06F 3/00* (2006.01)
*G06F 9/44* (2006.01)
*G06F 11/00* (2006.01)
*H04L 9/00* (2006.01)
(52) U.S. Cl. ............... 719/318; 717/124; 713/164; 726/22
(58) Field of Classification Search ......... 713/164–167; 717/136–167, 124; 718/104, 106; 719/318; 726/22–24; 714/25, 47, 48
See application file for complete search history.

(56) References Cited

U.S. PATENT DOCUMENTS

| | | | | |
|---|---|---|---|---|
| 5,628,016 A | * | 5/1997 | Kukol | 717/140 |
| 5,822,517 A | * | 10/1998 | Dotan | 726/22 |
| 6,272,636 B1 | * | 8/2001 | Neville et al. | 713/189 |
| 6,301,699 B1 | * | 10/2001 | Hollander et al. | 717/131 |
| 7,243,340 B2 | * | 7/2007 | Tobin | 717/130 |
| 2002/0147916 A1 | * | 10/2002 | Strongin et al. | 713/193 |
| 2002/0169999 A1 | * | 11/2002 | Bhansali et al. | 714/26 |
| 2003/0018681 A1 | * | 1/2003 | Subramanian et al. | 709/102 |

(Continued)

OTHER PUBLICATIONS

Anonymous "Protected error handling for microprocessor-based systems" Research Disclosure Database No. 312094 Research Disclosure Journal No. 31294 Research Disclosure Apr. 1990 pp. 1-2.*

(Continued)

*Primary Examiner*—Meng-Ai An
*Assistant Examiner*—Charles E Anya
(74) *Attorney, Agent, or Firm*—Woodcock Washburn LLP

(57) ABSTRACT

Safe exceptions detect and intervene in a malicious attack against an application or system component, even in the presence of a coding flaw such as a buffer overrun. A list of all the exception handlers in an image (e.g., a DLL or EXE) is desirably created. When loading the image into a process, the operating system loader finds and stores a reference to this list. When a subsequent attack targets exception handling by creating an attacker provided exception handler, the new attacker provided exception handler is compared to a list of the real exception handlers. The list of real exception handlers is stored in memory, and desirably cannot be modified. In particular, when an exception occurs, the operating system finds the proper exception handler from information on the stack (this may be under attack, so the information is not trusted) and compares it to the previously created read-only reference list. If the exception handler that has occurred is found on the reference list, the exception handler is allowed to execute. Otherwise, the operating system assumes the application is under attack and terminates the process' execution.

26 Claims, 4 Drawing Sheets

U.S. PATENT DOCUMENTS

2004/0064712 A1* 4/2004 Arthur et al. .................. 713/193
2004/0168078 A1* 8/2004 Brodley et al. ............... 713/200
2005/0010804 A1* 1/2005 Bruening et al. ............ 713/200

OTHER PUBLICATIONS

Bernaschi, M. et al., "Operating System Enhancements to Prevent the Misuse of System Calls", *Proceedings of the 7th ACM Conference on Computer and Communications Security*, Nov. 2000, 174-183.

Cierniak, M. et al., "Practicing JUDO: Java™ Under Dynamic Optimizations", *ACM Sigplan Notices, Proceedings of the ACM Sigplan '00 Conference on Programming Language Design and Implementation*, May 2000, 35(5), 13-26.

Cowan, C. et al., "Death, Taxes, and Imperfect Software: Surviving the Inevitable", *Proceedings of the 1998 Workshop on New Security Paradigms*, Jan. 1998, 54-70.

Engler, D.R. et al., "Exokernel: An Operating System Architecture for Application-Level Resource Management", *ACM Sigops Operating Systems Review, Proceedings of the Fifteenth ACM Symposium on Operating Systems Principles*, Dec. 1995, 29(5), 251-266.

Ogasawara, T. et al., "A Study of Exception Handling and Its Dynamic Optimization in Java", *ACM Sigplan Notices, Proceedings of the OOPSLA '01 Conference on Object Oriented Programming Systems Languages and Applications*, Oct. 2001, 36(11), 83-95.

Pietrek, M., "A Crash Course on the Depths of WIN32™ Structured EXception Handling", *Microsoft Systems Journal*, Jan. 1997, 19 pages.

Ramsey, N., "A Single Intermediate Language That Supports Multiple Implementations of Exceptions", *ACM Sigplan Notices, Proceedings of the ACM SIGPLAN '00 Conference on Programming Language Design and Implementation*, May 2000, 35(5), 285-298.

Yemini, S. et al., "A Modular Verifiable Exception-Handling Mechanism", *ACM Transactions on Programming Language and Systems*, Apr. 1985, 7(2), 214-243.

\* cited by examiner

SAFE EXCEPTIONS

FIELD OF THE INVENTION

This invention relates in general to the field of computer programming. More particularly, this invention relates to exception handling and the detection of an attack against a computer application or system component.

BACKGROUND OF THE INVENTION

Computer programs often contain flaws, and in some instances these flaws can be exploited in such a way that a security or privacy violation is possible. Conventionally, these flaws could only be prevented by careful testing and code review. Unfortunately, these techniques are not perfect and often production code is released with security flaws. It is desirable to detect a flaw and intervene at the time of attack.

Certain operating systems, such as Microsoft® Windows®, provide an exception handling (EH) model. Exception handling is a service (e.g., an operating system provided service) that operates or calls a particular function in response to a fault. Various exception handlers are typically implemented to handle various faults or exceptions that may occur. Functions that use exception handling may put information, such as pointers to the appropriate exception handling functions, in an EH registration on the stack. This has provided attackers with an opportunity to maliciously attack the EH model. In particular, an attacker can overrun a buffer and supply a value that causes an access violation, which in turn raises an exception. A buffer overrun typically provides the opportunity to rewrite a return address and the frame pointer. This is known as return address hijacking. It is noted that the exception handling function pointers are also vulnerable to hijacking. During stack unwinding, the operating system looks to the exception frames for exception handlers to which it should pass control. Because the exception handling frame was corrupted (e.g., by being overwritten), the operating system passes control of the program to arbitrary code supplied by the attacker. It is thus desirable to intervene in the middle of an attack and stop an attacker from hijacking the computer or otherwise interfering with the normal operation of the computer.

In view of the foregoing, there is a need for systems and methods that overcome the limitations and drawbacks of the prior art.

SUMMARY OF THE INVENTION

The present invention is directed to safe exceptions which detect and intervene in a malicious attack against an application or system component, even in the presence of a coding flaw such as a buffer overrun. A list of all the exception handlers in an image (e.g., a DLL (dynamic link library) or EXE (executable)) is desirably created. When loading the image into a process, the operating system (OS), such as Microsoft® Windows®, loader finds and stores a reference to this list. When a subsequent attack targets exception handling by creating an (attacker provided) exception handler (e.g., the attack overwrites the EH registration so that the pointer to the handler points somewhere else such as code provided by the attacker or code that already exists that will eventually pass control to code provided by the attacker), the new (attacker provided) exception handler is compared to a list of the real exception handlers. The list of real exception handlers is stored in memory (e.g., read-only memory), and desirably cannot be modified. In particular, when an exception occurs, the operating system finds the proper exception handler from information on the stack (this may be under attack, so the information is not trusted) and compares it to the previously created read-only reference list. If the exception handler that has occurred is found on the reference list, the exception handler is allowed to execute. Otherwise, the OS assumes the application is under attack and terminates the process' execution.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention protects against an exception handler (EH) attack in which an exception registration (which is one part of what is typically known as the frame for the function that makes the registration) is overwritten, thereby causing an exception to occur. The exception may call an attacker provided exception handler which essentially hijacks the system. The compiler knows which exception handlers are valid because it creates them and generates a list of the valid exception handlers. This list is provided to an exception dispatcher (which may be provided by the operating system (OS)). The exception dispatcher can then verify that an EH is real and not hijacked.

Exemplary Computing Environment

Figure 1:
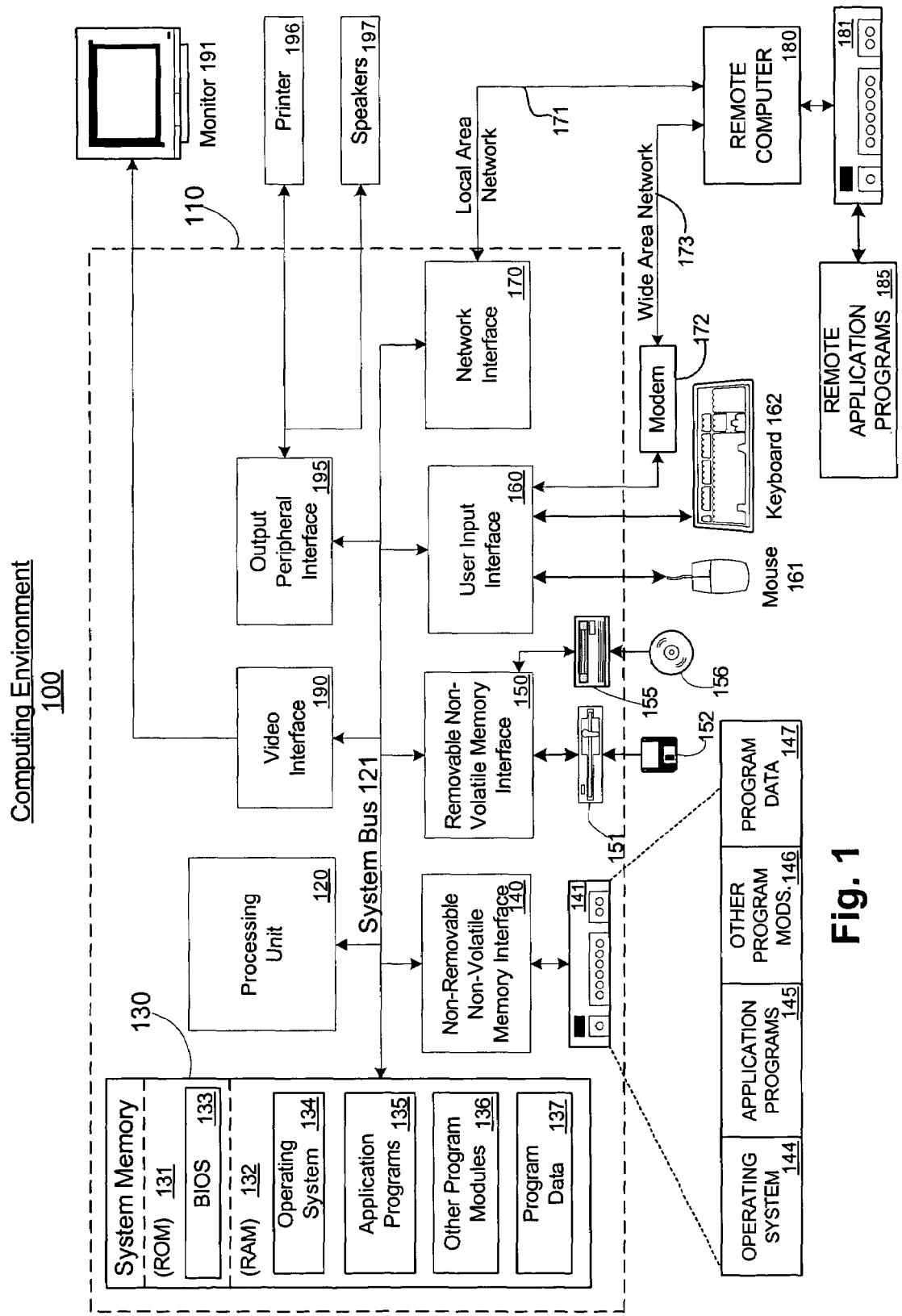
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, Microsoft®'s NET platform includes servers, building-block services, such as web-based data storage and downloadable device software. Generally speaking, the NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Microsoft® Office®, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that services may be performed by, supported in, or accessed via all of .NET's languages and services, and in other distributed computing frameworks as well.

Exemplary Embodiments

Figure 2:
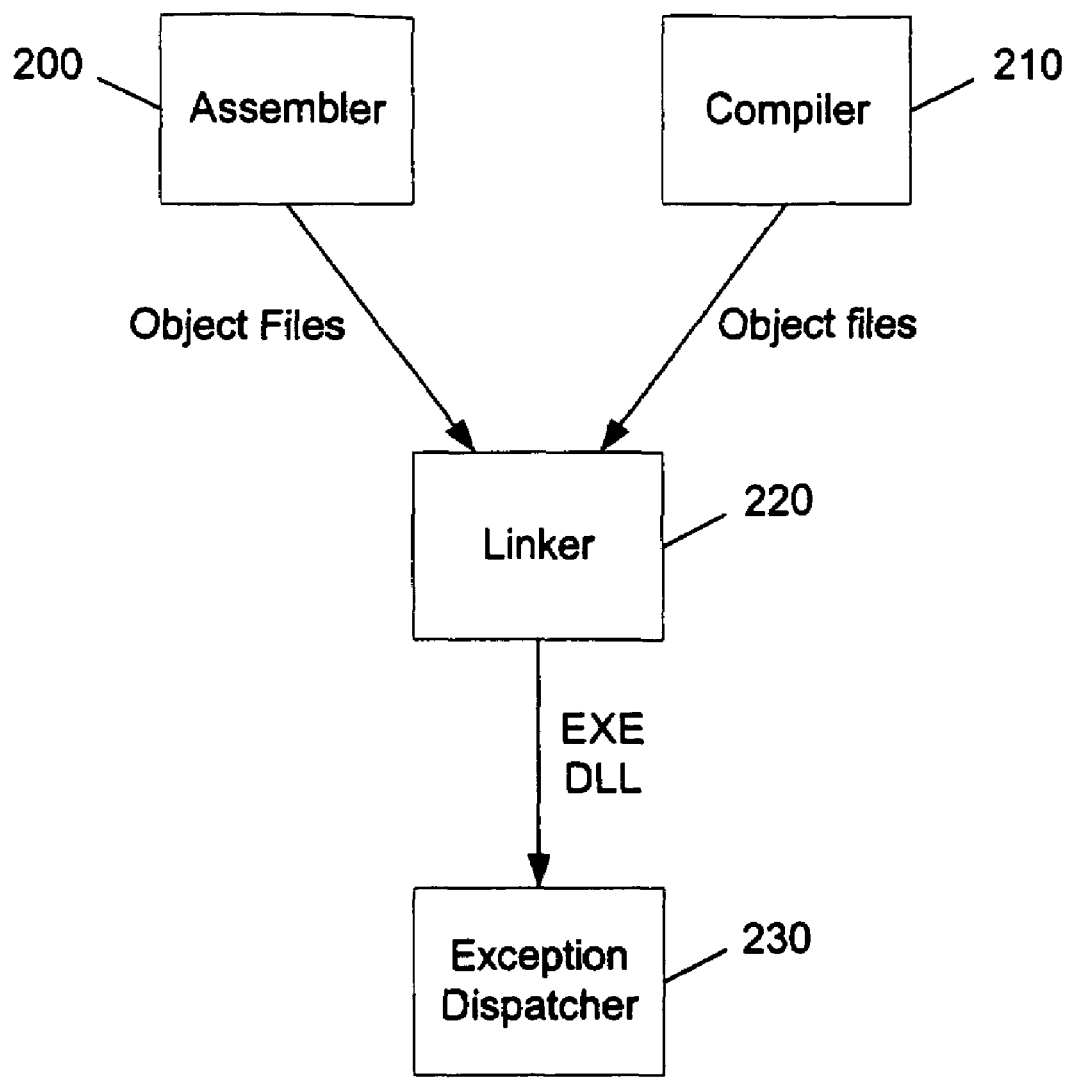
FIG. 2 is a block diagram of an exemplary system that is useful in describing aspects of the present invention.

The present invention provides the capability to detect and intervene in a malicious attack against an application or system component, for example, in the presence of a coding flaw such as a buffer overrun. When an attack targets exception handling, it will try to create an attacker provided exception handler. FIG. 2 is a block diagram of an exemplary system that is useful in describing aspects of the present invention. Generally, an assembler 200 and/or compiler 210 creates object files that are provided to linker 220 which, in turn, creates an image (e.g., a DLL (dynamic link library) or EXE (executable)) that is subsequently provided to an exception dispatcher 230 residing in an operating system or as a stand-alone, for example.

Figure 3:
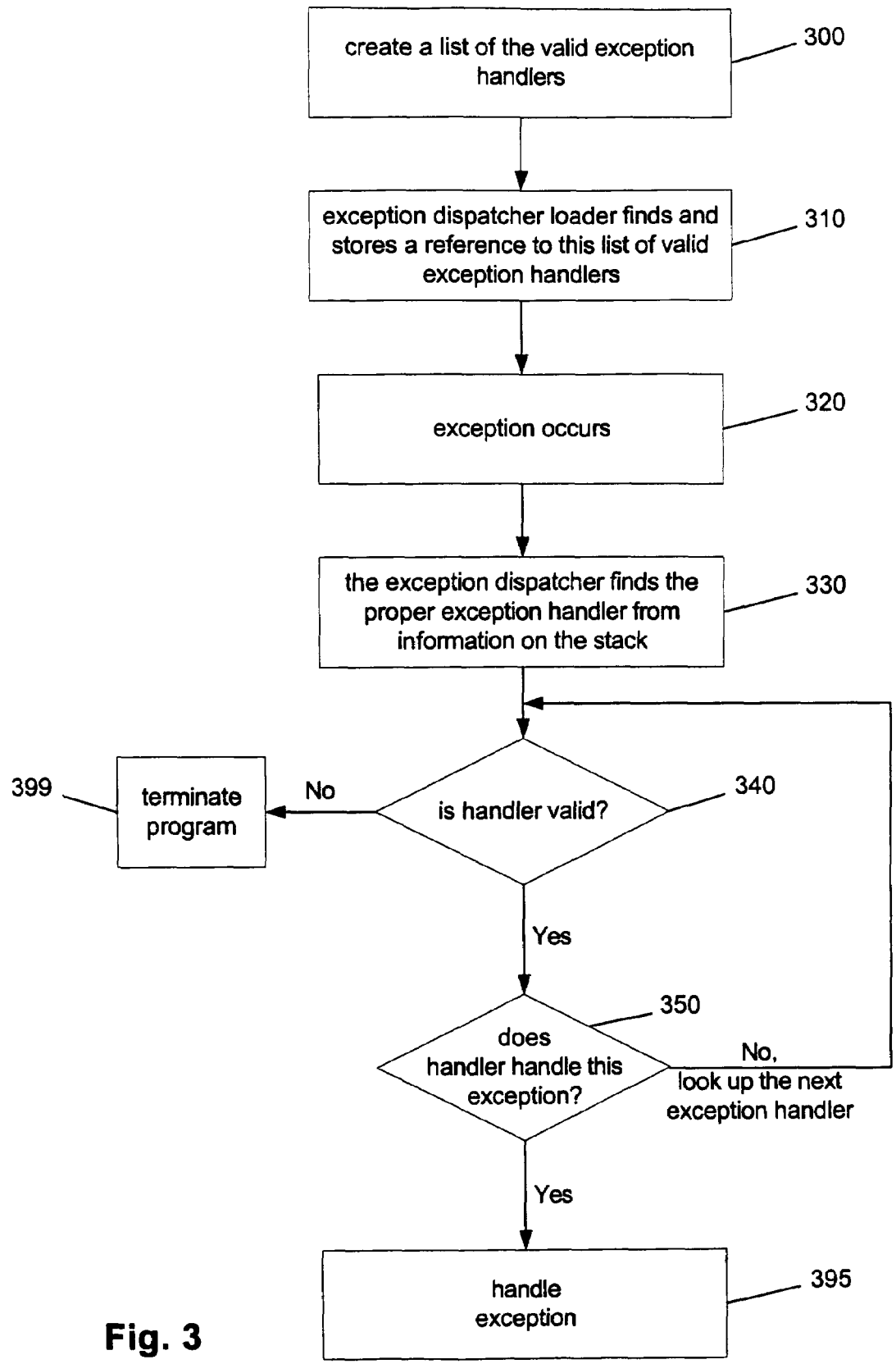
FIG. 3 shows a flowchart of an exemplary safe exception method in accordance with the present invention.

FIG. 3 shows a flowchart of an exemplary safe exception method in accordance with the present invention. At step 300, a compiler (e.g., compiler 210 in FIG. 2) creates a list of the valid exception handlers in an image (a DLL or EXE, for example). The list is inclusive of the valid exception handlers in the image. Desirably, the list of real exception handlers is then stored in read-only memory, so it cannot be modified. Thus, according to aspects of the invention, a global list is built that comprises all the valid exception handlers for all the images.

More particularly, a compiler such as compiler 210 compiles code and creates object files for each source file and produces a list of all the exception handlers referenced in exception handler registrations, which may or may not be generated by the compiler. For example, a common handler referenced in C code may be defined in an assembly language file that is a component of the C runtime libraries. The compiler identifies this as a valid handler when it references it, though it does not generate this. In contrast, a C++ handler is generated by the compiler in the same object file in which the reference occurs. The object file contains assembly language. In accordance with the present invention, the compiler emits an identifier (e.g., a particular "safe" bit, described below) into the object file. In other words, a compiler (in conjunction with the accompanying toolset, for example) desirably produces an executable that is marked such that the exception dispatcher, such as an OS, knows the executable supports safe exceptions. This can be referred to as a "safe executable".

To do this, the compiler produces individual object files that are each marked "safe" with a particular "safe" bit. For example, in the case of Visual C++, the "safe" bit may be a "@feat.00" bit. Thus, setting this bit declares that a section in the object file comprises a list of valid exception handlers for the executable code in that object. According to an embodiment, in Visual C++, this list of valid exception handlers is stored in a section named ".sxdata" (e.g., an .sxdata table), for example, where "sx" refers to safe exceptions. It is contemplated that if the object file does not contain an .sxdata section, but the bit marking the object file "safe" is present, then the code in the object file has no exception handlers. Thus, according to aspects of the invention, a module built by a compiler will have an .sxdata table comprising a list of (preferably, all) the known handlers for the module. Therefore, the compiler knows at compile time which functions are truly exception handlers. This information is preferably stored in a memory and shared with the operating system which can then verify if a called exception handler is valid or not.

A linker 220 then brings the object files together into a module, such as an executable or a DLL. Subsequently, at step 310, when loading the image into a process, a loader (e.g., an OS loader) finds and stores a reference to this list of valid exception handlers.

An exemplary sequence of events when an exception occurs are as follows. At step 320, an exception occurs, and at step 330, an exception dispatcher 230 (also referred to herein as provided by an OS, though this is not essential) finds the proper exception handler from information on the stack (the stack may be under attack, so the information stored therein is not trusted). The exception dispatcher then determines from the valid exception handler list, at step 340, whether the exception handler is valid or not. If not, the exception dispatcher assumes the application is under attack and terminates the process' execution, at step 399. In such a case, an error message can be generated and displayed, for example.

If the exception handler is found in the list, it is thus concluded that the handler is valid. Next, at step 350, it is determined if the exception handler can be used to handle the exception that occurred at step 320. If so, the exception handler is allowed to execute, at step 395. Otherwise, another exception handler is retrieved from the stack and processing continues at step 340.

More particularly, according to an embodiment, when an exception occurs, the OS, before passing control of execution to the specified exception handler, determines if the address of this handler is in the .sxdata table. If so, the exception handler is called and execution proceeds normally. If the handler's address is not in the .sxdata table, the exception dispatcher (e.g., provided by the operating system) assumes that the exception handler has been corrupted and aborts the program. Thus, a module (e.g., DLL or EXE) that is compiled with this system will be immune to virtually every exception handling attack.

Figure 4:
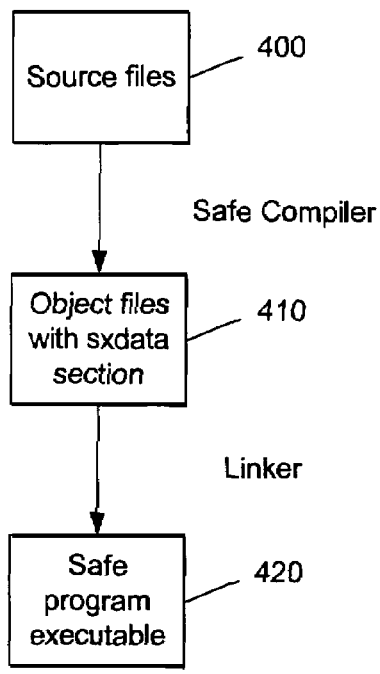
FIG. 4 is a high level flow diagram showing exemplary steps in accordance with the present invention.

Thus, according to an embodiment, a compiler creates an .sxdata section for each object it compiles and includes the address of all the exception handlers in this section. FIG. 4 is a high level flow diagram showing exemplary steps in accordance with the present invention. Source file(s) 400 are provided to a compiler which generates object files 410 having a safe .sxdata section. A linker then creates a safe program executable 420 based on the safe object files. If the executable is built with a compiler supporting safe exceptions, then the resulting executable is safe. Preferably, if there are no exception handlers, no .sxdata section is created. Objects emitted by the compiler desirably include a safe bit, such as symbol "@feat.00" which has the value 0×00000001, for example. This symbol is desirably used by the linker to determine that the object has safe exceptions.

According to an embodiment, the assembler (e.g., assembler 200 in FIG. 2) has the capability to include the safe bit (e.g., a @feat.00 symbol) in generated or emitted object files. To do this, the assembler preferably adds a command-line switch to include this information. The command-line switch is "/safeseh", for example, with the description "enable safe exceptions". The assembler preferably uses a directive (e.g., a handler symbol) to emit the .sxdata for the portions of assembler code that contain exception handlers. Thus, a command-line switch is added to emit the symbol with the safe exceptions feature bit turned on.

The linker (e.g., linker 220) then links these object files together to produce an image with executable code. Desirably, the object files are marked with the safe bit, so the resulting image will be safe. It is desired that all the contributing members of an executable are safe to guarantee that the resulting image is safe. The linker puts all the object files together and uses the .sxdata table from each image and combines them. The linker also desirably sorts the list and ensures that there are no duplicate entries. The linker then produces the image and provides a pointer to this combined list of valid exception handlers (e.g., in the image's "load config" structure). This structure is later used to find the table of valid exception handlers, which is preferably located in the read-only data section of the executable.

If not all the object files going to the linker are marked safe, then the linker preferably can determine whether the resulting image should be marked safe (i.e., it contains the "Safe Exception Table" pointer in the load config structure). It is contemplated that the linker can indicate that it is acceptable for an object file to not be marked safe when the object file has no code in it (and therefore the contents of the object file cannot raise an exception or handle an exception, because only instruction code can do that). If any individual object file cannot be determined to be safe, either by being marked safe or having no code, then including that object file in the final image will render the final image not safe. Being not safe means that the image is treated as executables have been treated conventionally during exception handling (that is, exception handlers will not be validated before they are allowed to execute).

Thus, the linker is a program that desirably determines whether the module has safe exceptions. For a module to have safe exceptions, desirably, every object file has the safe bit (e.g., @feat symbol). The linker scans each object for the @feat symbol to determine if it is safe or not. If the object has an @feat symbol, then the linker preferably checks a bit, such as the least significant bit, to ensure sure the object is registering its handlers. The least significant bit is preferably used to indicate that the object is safe. If the bit is not set, the object is checked to determine if it has code associated with it. If not, then it is determined that the image is safe. If every object does not have the symbol, then it is determined that the resulting image (e.g., DLL or EXE) does not have safe exceptions. For objects that do not have the symbol, the linker then preferably verifies that those objects have no sections marked as executable or code. The linker will merge each of the .sxdata sections and sort the list of handler addresses. If the image has safe exceptions, then the image will include the .sxdata section. If some, but not all, object files have an .sxdata section, then the linker desirably issues a warning and no .sxdata section is eliminated. For object files that do not have executable sections, the symbol is not used.

A runtime aspect of the present invention is provided by the OS loader and exception dispatcher. When the OS loader is asked to bring an executable into memory (either by starting a process or calling "LoadLibrary", for example), if that executable is marked safe, the loader remembers where the safe exception is for that image.

When an exception occurs, the OS looks up where the first exception handling frame is by following a frame pointer. At this point, the OS has a pointer to the first exception handler. Because this pointer is located on the execution stack for the thread, it is possible that a buffer overrun could have overwritten this pointer. The exception dispatcher for the OS validates the pointer by looking it up in the list for the image where the pointer is pointing to. If the pointer is a valid exception handler (i.e., it is in the list), then the exception dispatch continues as normal. If the pointer is not in the list of valid, safe exception handlers, then the process terminates because the OS assumes that the execution stack was the target of an attack.

Because multiple executable images can be loaded into a process, it is desirable for each image to be marked safe. Hence the notion that memory is segmented into areas that are safe for exception dispatch and areas that are not safe. A safe segment of memory is one where the image loaded was marked safe, or the segment is known by the OS that it should not contain any exception handlers (e.g., a memory mapped data file, or the execution stack). An unsafe segment of memory is any executable image loaded that was not safe, or the heap. The heap over time should be marked safe, but doing so immediately may break too many programs and is therefore not desirable. If the exception handling frame is pointing to an exception handler in an unsafe region, the OS cannot ensure safety and dispatches to that exception handler, assuming it was valid. When the OS is asked to dispatch to an exception handler in a safe region, it desirably either has a table to look up the exception handler in, or it can unilaterally determine that no exception handler should exist in that memory segment.

Figure 5:
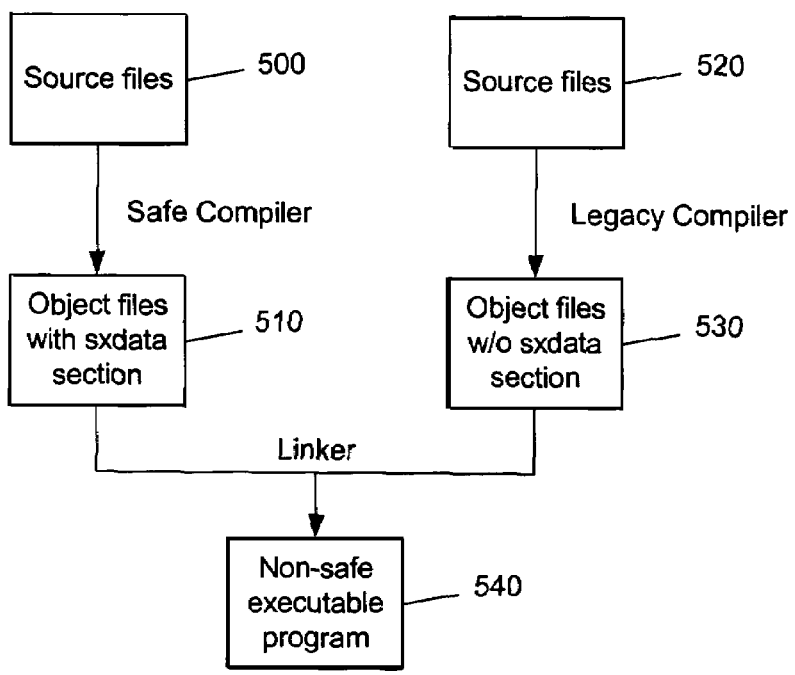
FIG. 5 is a high level flow diagram of an exemplary process in which some of the object files do not support safe exceptions in accordance with the present invention.

FIG. 5 shows a high level flow diagram of an exemplary process in which not all of the object files support safe exceptions in accordance with the present invention. Some source files 500 are compiled with a "safe" compiler, as described above, to create object files 510 having an .sxdata section. Other source files 520 are compiled with a conventional (legacy) compiler to create conventional object files 530 that are not adapted to safe exceptions. A linker links the object files 510, 530 and creates a program 540. The program is deemed to be not safe because it was created with object files 530 that do not support safe exceptions. Therefore, as shown in FIG. 5, when a program is built with object files from a compiler that does not support safe exceptions, the resulting image is determined to be not safe.

When the OS is ready to pass control to the exception handler, it checks to see if the module with the exception handler has an .sxdata section which contains a sequence of indices for the items that represent or contain handlers. If so, the OS goes to the .sxdata table and determines if the handler's address is listed in the table, using a binary search, for example. If it is listed, the exception handler executes. If the handler's address is not listed in the .sxdata table, the exception handler is determined to be malicious and the operating system terminates the program.

According to further aspects of the invention, the file format is desirably backwards compatible with previous executables, and it is noted that the format is not compulsory. According to aspects of the invention, preferably there is a symbol, such as an "at feature" @feat.oo symbol, that is put into the object file, that is used so older programs, that do not implement the safe exceptions features of the present invention, will ignore it.

Attacks that overwrite the exception registration can leave the exception handler pointer referring to a valid exception pointer (e.g., one that is found in the .sxdata for the module holding that handler), while leaving other data in the exception registration (e.g., the scope table pointer) referring to attacker-supplied data. This can be protected against by adding security cookies to the exception registration or by performing additional validity checks. This is desirable in cases in which the exception registration contains pointers other than just to the exception handler.

The present invention substantially eliminates or significantly reduces exception handling attacks. Thus, aspects of the present invention can provide improved security and stability of the operating system that it operates in conjunction with.

It is contemplated that the safe exceptions features of the present invention can be implemented in an operating system, such as a Microsoft® Windows® operating system, and compilers that generate code that run on the OS, such as Visual C++ and the Microsoft®.NET common language runtime's JIT compiler, for example. It is further contemplated that the exception handling techniques of the present invention can be provided as a stand-alone service or as part of an operating system provided service, for example.

The techniques for safe exceptions in accordance with the present invention may be applied to a variety of applications and devices. While exemplary programming languages, names and examples are chosen herein as representative of various choices, these languages, names and examples are not intended to be limiting. For example, the present invention can be used with traditional executable generation with compilers and assemblers generating objects which are consumed by a linker that generates an executable, and/or can be used with compilers that generate executables directly (e.g., C# and VB compilers). It is also contemplated that the present invention can be implemented in environments where code is JITed at runtime, such as the NET runtime, where the object file mechanism with sxdata or the handler list in the executable produced by the linker do not apply.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the safe exceptions aspects of the present invention can be implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission. When the program code is received and loaded into and executed by a machine, such as an EPROM, a gate array, a programmable logic device (PLD), or a client computer, or the like, it becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer implemented method for handling safe exceptions, comprising:
   receiving an event;
   determining an exception handler for the event;

determining that the exception handler is valid by comparing the exception handler to at least one list of valid exception handlers and determining that the exception handler is unaltered, and otherwise determining that the exception handler is invalid; and executing the exception handler when the exception handler is valid, wherein said at least one list of valid exception handlers is generated by:

identifying one or more valid exception handler associated with software components to be compiled;

including a safe exception section with each compiled software component, said safe exception section comprising addresses of valid exception handlers in the software component;

marking the compiled software component when the compiled software component references or contains at least one of said one or more valid exception handlers, said marking operable to identify that the software component is associated with a valid exception handler;

generating at least one list of valid exception handlers, said at least one list comprising the valid exception handlers included or referenced in the compiled software components;

storing said at least one list of valid exception handlers in a protected area during program execution.

2. The method of claim 1, further comprising one of receiving and generating the list of valid exception handlers.

3. The method of claim 1, further comprising retrieving a list of valid exception handlers from a storage device and comparing the exception handler to the list of valid exception handlers in determining if the exception handler is valid.

4. The method of claim 1, further comprising generating a list of valid exception handlers by compiling code into at least one of an object file and an image.

5. The method of claim 1, further comprising, if the exception handler is valid, determining whether the exception handler handles the event, and if so, executing the exception handler, and otherwise, retrieving a second exception handler from information on a stack and continuing processing with determining if the second exception handler is valid.

6. The method of claim 1, further comprising terminating the method if the exception handler is invalid.

7. The method of claim 1, further comprising generating an error message if the exception handler is invalid.

8. The method of claim 1, further comprising, if the exception handler is valid, verifying other data for the event.

9. The method of claim 8, wherein the other data comprises pointer data.

10. A computer-readable storage medium having stored thereon computer-executable instructions for handling safe exceptions, the computer-executable instructions comprising instructions for:

receiving an event;

determining an exception handler for the event;

determining that the exception handler is valid by comparing the exception handler to at least one list of valid exception handlers and determining that the exception handler is unaltered; and otherwise determining that the exception handler is invalid; and executing the exception handler when the exception handler is valid, wherein said at least one list of valid exception handlers is generated by:

identifying one or more valid exception handler associated with software components to be compiled;

including a safe exception section with each compiled software component, said safe exception section comprising addresses of valid exception handlers in the software component;

marking the compiled software component when the compiled software component references or contains at least one of said one or more valid exception handlers, said marking operable to identify that the software component is associated with a valid exception handler;

generating at least one list of valid exception handlers, said at least one list comprising the valid exception handlers included or referenced in the compiled software components;

storing said at least one list of valid exception handlers in a protected area during program execution.

11. The computer-readable storage medium of claim 10, having further computer-executable instructions for one of receiving and generating the list of valid exception handlers.

12. The computer-readable storage medium of claim 10, having further computer-executable instructions for retrieving a list of valid exception handlers from a storage device and comparing the exception handler to the list of valid exception handlers in determining if the exception handler is valid.

13. The computer-readable storage medium of claim 10, having further computer-executable instructions for generating a list of valid exception handlers by compiling code into at least one of an object file and an image.

14. The computer-readable storage medium of claim 12, having further computer-executable instructions for, if the exception handler is valid, determining whether the exception handler handles the event, and if so, executing the exception handler, and otherwise, retrieving a second exception handler from information on a stack and continuing processing with determining if the second exception handler is valid.

15. The computer-readable storage medium of claim 10, having further computer-executable instructions for terminating the method if the exception handler is invalid.

16. The computer-readable storage medium of claim 10, having further computer-executable instructions for generating an error message if the exception handler is invalid.

17. The computer-readable storage medium of claim 10, having further computer-executable instructions for, if the exception handler is valid, verifying other data for the event.

18. The computer-readable storage medium of claim 17, wherein the other data comprises pointer data.

19. A system for executing safe exceptions, comprising:

at least one processor; and at least one memory communicatively coupled to said at least one processor, the memory having stored therein computer-executable instructions for implementing:

receiving an event;

determining an exception handler for the event;

determining that the exception handler is valid by comparing the exception handler to at least one list of valid exception handlers and determining that the exception handler is unaltered, and otherwise determining that the exception handler is invalid; and executing the exception handler when the exception handler is valid, wherein said at least one list of valid exception handlers is generated by:

identifying one or more valid exception handler associated with software components to be compiled;

including a safe exception section with each compiled software component, said safe exception section comprising addresses of valid exception handlers in the software component;

marking the compiled software component when the compiled software component references or contains at least one of said one or more valid exception handlers, said marking operable to identify that the software component is associated with a valid exception handler;

generating at least one list of valid exception handlers, said at least one list comprising the valid exception handlers included or referenced in the compiled software components;

storing said at least one list of valid exception handlers in a protected area during program execution.

20. The system of claim 19, further comprising a storage device that stores a list of valid exception handlers, and the exception dispatcher system retrieves the list of valid exception handlers from the storage device and compares the exception handler to the list of valid exception handlers in determining if the exception handler is valid.

21. The system of claim 19, wherein the exception dispatcher system, if the exception handler is valid, determines whether the exception handler handles the event, and if so, executes the exception handler, and otherwise, retrieves a second exception handler from information on a stack and continues processing with determining if the second exception handler is valid.

22. The system of claim 19, wherein the exception dispatcher system terminates processing if the exception handler is invalid.

23. The system of claim 19, wherein the exception dispatcher system generates an error message if the exception handler is invalid.

24. The system of claim 19, wherein an image is provided to the exception dispatcher system, said image created based on at least one object file received from at least one of a compiler and an assembler.

25. The system of claim 19, wherein the exception dispatcher system, if the exception handler is valid, verifies other data for the event.

26. The system of claim 25, wherein the other data comprises pointer data.

* * * * *